Patented Feb. 13, 1934

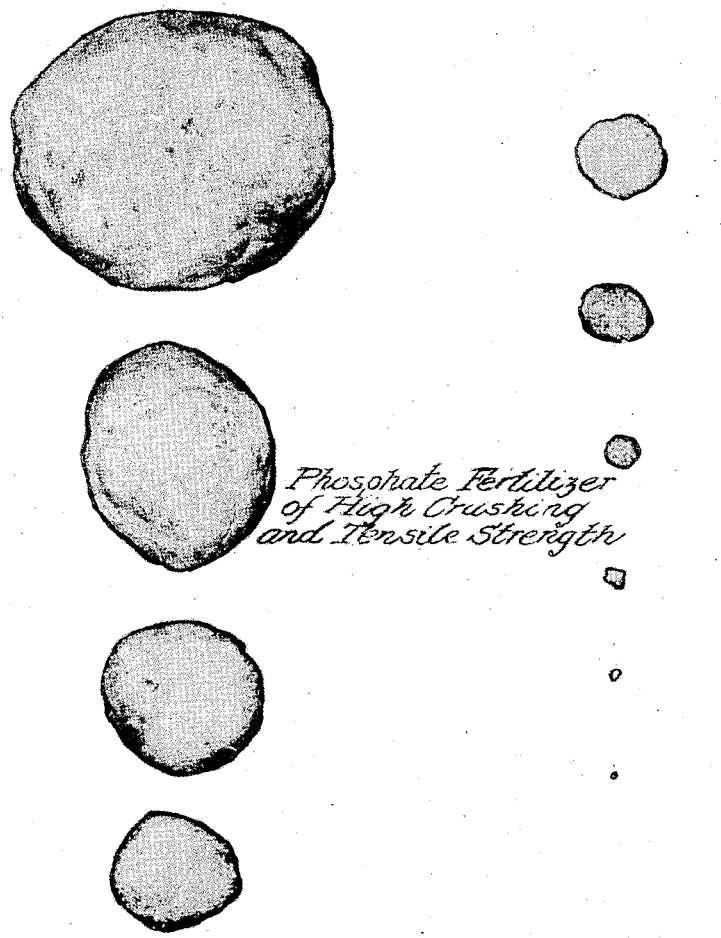

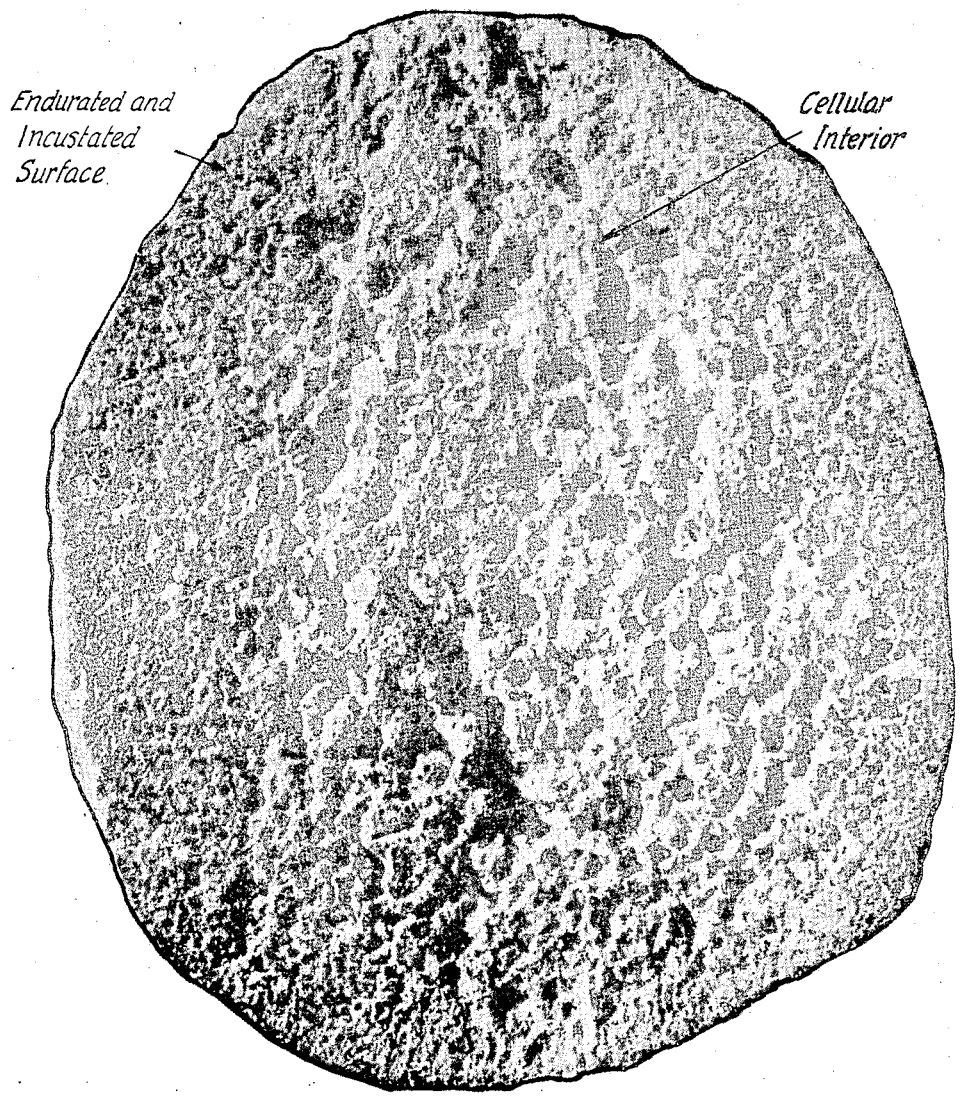

1,947,138

UNITED STATES PATENT OFFICE 1,947,138

FERTILIZER everly Ober and Edward H. Wright, Baltimore, Md., assignors to The Oberphos Company, Baltimore, Md., a corporation of Maryland Application February 27, 1931. Serial No. 518,851

13 Claims. (Cl. 71—7)

This invention relates to the manufacture of phosphate fertilizers and is a continuation in part of prior applications Serial Nos. 117,170 and 172,359, now Patents 1,869,941 and 1,837,329 respectively.

In the processes now used to obtain phosphate fertilizers such as acid phosphate, it is the general practice to treat ground phosphate rock with sulphuric acid in an open container. This mixture is agitated for a relatively short period and the resulting sludge is deposited in a den. In this den the reaction between the insoluble phosphate and acid proceeds until the mixture sets. It is then transferred to storage sheds wherein it is allowed to remain until the reaction is run to completion and the product is cured. Such processes are uneconomical in that the output is limited by the large time factor involved and the return is small in view of the large outlay in plant.

The primary object of the present invention is to provide a new phosphate fertilizer product.

Another object is to provide a granular phosphate fertilizer, the individual particles of which have high mechanical strength.

Yet another object is to provide a process by which a product of a superior physical condition may be prepared and be ready for immediate use.

A further object is to provide a phosphate fertilizer product of globular or nodular form which is characterized by high percentage available phosphate and a minimal amount of free acid.

A further object is to provide a phosphate fertilizer product which is immediately readily grindable.

With these and other equally important objects in view, the invention comprehends the treatment of insoluble phosphate with an acid in a closed container in which effective control of the reactions is maintained so as to insure a high acidulation and to produce as an immediate product a material of porous ball form and comprising nodulated or globoid particles of various sizes. These particles are characterized by relatively high mechanical strength.

To more completely illustrate the improved product, photographs of it are shown in the accompanying drawings, in which:

Figure 1 is a photograph showing the variations in actual size of the nodules or particles as actually prepared; and Fig. 2 is a photograph, magnified ten times, illustrating the vesicular or cellular internal structure and the indurated or encrustated outer surface.

As disclosed in the prior applications cited above, the process, for example, may be carried out by simultaneously charging predetermined and respectively proportional quantities of an acid, such as sulphuric acid, and finely ground phosphate rock into an autoclave. The autoclave is of the horizontal rotary type and is provided with hollow shafts. Through one of these the charging mixture is admitted and through the other gases or vapors are withdrawn by means of a vacuum pump for the purpose of controlling the pressures in the container and for evacuating the container for the purpose of drying the product.

After the rock acid mixture has been charged to the container the autoclave is continuously rotated during the reaction of the material. Due to this rotation the mass within the autoclave is constantly densified and resurfaced, thereby bringing the acid into contact with fresh surfaces of the unattacked phosphate.

The reaction between the tricalcium phosphate and the acid proceeds vigorously and eventuates in gaseous as well as solid products of reaction. The evolution of the steam and gases, if retained, causes a building up of superatmospheric pressures. These pressures may or may not be maintained and can be controlled to any desired degree either by withdrawing some of the gases through the vacuum line or releasing them through a suitably positioned blowoff valve.

This reaction between the rock and the acid may be accelerated by applying heat to the mass. This may readily be done by coursing a heating medium through the hollow thermal jacket of the autoclave. Steam may be employed as the heating medium and when used at a pressure of about fifty pounds supplies sufficient heat to accelerate the reaction to the optimum degree.

In actual operation, using approximately an 82-100 ratio, for example, (82 lbs. of acid calculated as 52° Bé., to 100 lbs. of phosphate rock dust; actual strength of acid used—54° Bé.) of acid to dust the mass is maintained in the autoclave for a period of about one-half hour during which the digestion proceeds. Throughout the digestion period, as noted, the material is constantly agitated. In spite of the fact that the products of reaction comprise among other things mono-calcium phosphate and calcium sulphate, the mass is maintained in more or less fluent condition, for upon opening the autoclave at the end of a digestion period it is found that the material is not a sponge-like intumesced structure as in the case of the den processes.

It may be mentioned here that nitrogenous material such as ammonium sulphate or urea and/or potash material, such as potassium sulphate or carnallite, may be included, as for example, by mixing them with the ground phosphate rock or by dissolving them in the sulphuric acid. The resulting products are in the characteristic porous ball form and contain in addition to the superphosphate, the nitrogenous or potash materials, or both.

After the reactions have run to substantial completion the conditions within the autoclave are adjusted to dry the product. This is done by first blowing off the gases and vapors which have accumulated during the digestion period (if superatmospheric pressure is used). These gases and vapors may be evacuated by opening a blowoff valve on the autoclave and allowing the gases to flow out for a period of time sufficient to reduce the pressure to substantially atmospheric. If desired, the autoclave may be evacuated by withdrawing the gases and vapors through the vacuum line by operating the vacuum pump. In any event, after the blowoff period the autoclave is then evacuated, that is to say is placed under subatmospheric pressure. In the usual run the vacuum pump is operated at approximately a 26 to 29 inch vacuum for a period of one-half hour, more or less. During this evacuation period the mass is maintained under agitation by continuing the rotation of the autoclave. To facilitate drying of the material it is desirable in most runs to apply additional heat, although in many instances the sensible heat of the mass may be of sufficiently high value to provide the thermal units necessary for drying. When it is desired to heat the material during the drying period this may be done by coursing steam through the thermal jacket at a pressure of approximately fifty pounds.

It will thus be seen that for a run of approximately an hour a fertilizer material is completely prepared. A five ton autoclave may be charged within a period of less than one and one-half minutes. This material may be digested in approximately one-half hour, preferably under superatmospheric pressure of fifty pounds more or less. It will be appreciated that the pressure may be varied quite widely and will vary depending upon the type of raw products employed, for with a high carbonate content the pressures tend to increase. The pressure may be maintained at any desired value by intermittently blowing off during the digestion period. In ordinary circumstances, as noted above, a pressure of approximately fifty pounds is maintained during digestion.

The material produced as a result of this digestion and vacuum drying may immediately be discharged from the autoclave. In sharp contradistinction to the den product, and as shown in the drawings, this material is in the form of porous balls or discrete nodules or globules varying in size from very small pellets up to balls of several inches in diameter. The nodules or balls shown in Fig. 1 are representative of the variation in size with respect to appearance and external characteristics, but do not depict actually the maximum and minimum sizes. As pointed out hereinbefore, many of the nodules or balls are sufficiently small to be applied directly to the soil without grinding. A characterizing feature of this product is that the nodules or balls themselves are quite hard and possess a high mechanical strength. This mechanical strength is so high that it is possible to rigorously handle the material without disintegration. This, as will be understood, is a decided advantage and an improvement over the old den product.

Another striking characteristic of the product immediately discharged from the autoclave is that it is encrusted, that is to say the exterior surface is a relatively finely grained dense substance, as shown clearly in Fig. 2.

Due to the high mechanical strength of the product and to the variation in size, it is possible to immediately screen the product and use the fine screenings directly and without grinding for application to the soil. These immediate screenings represent a substantial volume of the total run, in many instances ranging between 25 and 50% of the treated mass.

The product is characterized by other advantageous features, as the following example indicates:

Acid and dust in the ratio of 86 to 100 parts by weight (using acid calculated as 52° Bé. but used as 54° Bé.) was charged into an autoclave. This mass was maintained under continuous agitation and heated under approximately fifty pounds steam pressure for a period of one-half hour, while maintaining pressure of between forty and fifty pounds in the autoclave. The autoclave was blown off for a period of three to five minutes and the container then evacuated for about thirty-five minutes with a vacuum of about twenty-eight inches. During the drying period the autoclave was rotated to continue the agitation of the material and heat applied by maintaining a pressure of fifty pounds of steam in the thermal jacket. The product was in very good condition with a small moisture content containing a suitable quantity of very fine nodules and larger nodules or globules of quite uniform size. There was substantially no adhesion of material to the interior wall of the autoclave.

This material was analyzed one day after the run and showed the following:

| | |
|---|---|
| Percentage moisture | 5.7 |
| Percentage total $P_2O_5$ | 20.0 |
| Percentage insol. $P_2O_5$ | 1.2 |
| Percentage water sol. $P_2O_5$ | 15.3 |
| Percentage citrate $P_2O_5$ | 3.5 |
| Percentage acidulation | 94.0 |
| Percentage free $H_2SO_4$ | 0.2 |
| Percentage free $H_3PO_4$ | 4.1 |

After seven days the material was again analyzed and showed the following:

| | |
|---|---|
| Percentage moisture | 4.4 |
| Percentage total $P_2O_5$ | 20.2 |
| Percentage insol. $P_2O_5$ | .8 |
| Percentage water sol. $P_2O_5$ | 14.9 |
| Percentage citrate $P_2O_5$ | 4.5 |
| Percentage acidulation | 96.0 |
| Percentage free $H_2SO_4$ | 0.0 |
| Percentage free $H_3PO_4$ | 1.7 |

It will be noted that the initial or intermediate product is in such condition as to be immediately utilized as a fertilizer, and that after a very brief curing period it is considerably improved, not only because of the reduction in the moisture content but also because of the increase in total and available $P_2O_5$. The brief curing period, as will be noted, substantially eliminates free sulphuric acid and reduces the free phosphoric acid to a very small percentage. An outstanding characteristic of the process and the product is the high acidulation in view of the acid rock ratio employed. The product obtained from the autoclave may be ground immediately before or after screening. The grinding of den superphosphate immediately after its removal from the den is a physical impossibility. Furthermore, the autoclave superphosphate is in such physical condition that it is readily and conveniently mixed with other fertilizer substances.

The product obtained by these processes presents other characteristics which markedly differentiate it from the prior superphosphate products prepared by the den method.

Determination of drillability

In order to distinguish from superphosphates prepared by the ordinary den method and that produced by autoclaving, samples of portions of each product were run through a typical fertilizer drill which was mechanically driven and set to distribute the fertilizer at two different rates. The drilling properties were compared under the same conditions. The rates of flow were calculated to pounds per acre (upon the hypothesis that the drill was drawn at the average speed of three miles per hour). The results of these drilling tests are shown below:

|  | Rates at which material passed through drill in lbs. per acre | |
|---|---|---|
|  | Setting 1 | Setting 2 |
| Den superphosphate (17% available $P_2O_5$) | 32.5 | 132.5 |
| Autoclave phosphate (17% available $P_2O_5$) | 35.0 | 252.5 |

It will be noted that with the drill set at either of the two points chosen, the rate of flow of the autoclave superphosphate was considerably greater than that for the den superphosphate. Also this difference in favor of the autoclave superphosphate was much more marked where the drill was set to deliver at a high rate, for under these conditions the natural flow of the materials plays an important part. Furthermore it was noted, during the course of the tests, that the flow of the autoclave product through the drill was considerably more uniform than that of the den product.

Determination of the angle of repose

In addition to the drilling test, the angle of repose of each product was also determined. This term means the angle assumed by a conical pile of relatively fine material when it is carefully poured from one source. This angle is the result of the force of gravity and the adhesive force of the material, and in a large measure determines the ease of flow through a drill, since the angle of repose decreases as the ease with which the flow of material increases. This angle of repose is therefore generally considered to be an accurate criterion of the free flowing or drillable qualities of a fertilizer. The results of these tests are as follows:

Angle of repose
Den superphosphate (17% available $P_2O_5$) _ 41.0°
Autoclave superphosphate (17% available $P_2O_5$) _____ 37.0°

It will be noted that the autoclave superphosphate showed marked superiority, in angle of repose, over the den product.

In order to further and more completely bring out the striking characteristics of the autoclave superphosphate and its superiority over the den product, other physical tests were conducted. These were made for the purpose of determining the mechanical strength of the two products. Representative characteristic analyses of these two materials are as follows:

|  | Moisture | Total $P_2O_5$ | Insol. $P_2O_5$ | Avail. $P_2O_5$ | Free acid |
|---|---|---|---|---|---|
| Den superphosphate | 11.95 | 17.68 | 0.78 | 16.9 | 4.5 |
| Autoclave superphosphate | 7.0 | 20.32 | 0.88 | 19.44 | 2.8 |

Compression test

The two materials, that is to say the den superphosphate and the autoclave superphosphate, were subjected before disintegration to compression tests in the well known manner. The results of these are given below:

Autoclave superphosphate

|  | Fresh | 14 days old |
|---|---|---|
|  | Lbs. per sq. in. | Lbs. per sq. in. |
| Sample No. 1 | 183 | 373 |
| Sample No. 2 | 171 | 289 |
| Sample No. 3 | 173 | 423 |
| Average | 176 | 362 |

Den superphosphate

|  | Fresh | 14 days old |
|---|---|---|
|  | Lbs. per sq. in. | Lbs. per sq. in. |
| Sample No. 1 | 5.1 | 23 |
| Sample No. 2 | 15.6 | 37 |
| Sample No. 3 | 11.2 | 27 |
| Average | 10.3 | 29 |

The superiority of the autoclave superphosphate over the den superphosphate, and particularly when freshly made, is further strikingly indicated in the following table. As is well-known, the den superphosphate, when freshly made, can not readily be handled. If it is subjected to any working or pressure, it tends to plasticize or become clayey. For this reason in the prior manufacture of den phosphate it was necessary to dust the freshly made product with absorbent materials, such as ground phosphate rock. In the previous table the average compressive strength of freshly made autoclave superphosphate is about 176 lbs. per sq. inch as against approximately 10 lbs. per sq. inch for the den product. The difference in tensile strength of the two freshly made products is equally as striking, as shown in the following table.

*Tensile strength test—autoclave superphosphate*

Lbs. per sq. in.
Sample No. 1 _____ 50
Sample No. 2 _____ 40

*Tensile strength test—den superphosphate*

Lbs. per sq. in.
Sample No. 1 _____ 0
Sample No. 2 _____ 0

To further determine the differential physical characteristics of the two products small billets of each product were tested for penetration by using the Gilmore needle test. In this determination two separate tests were made on each sample, using first a ¼ lb. weight and then a 1 lb. weight. The penetration of the needle is expressed in mm. The results of these tests are as follows:

*Penetration test—Autoclave superphosphate*

Sample No. 1 — ¼ lb _____ 1 lb.
0 mm _____ No measurable impression

*Penetration test—Den superphosphate*

Sample No. 1 — ¼ lb _____ 1 lb.
4 mm _____ 21 mm.

The Gilmore needle test, illustrating the resistance to penetration of the two products, brings out the salient characteristic of high mechanical strength possessed by the autoclave product. When testing a freshly prepared autoclave product with a Gilmore needle depressed with a ¼ lb. weight, no penetration was effected. By increasing this weight to 1 lb. no measurable impression was made in the billet.

The den product, on the other hand, comparatively to the autoclave product, showed very little resistance to penetration. Even a ¼ lb. weight on the needle depressed it 4 mm. into the den superphosphate, while 1 lb. depressed the needle 21 mm.

It will be noted from perusal of these tests that the autoclave superphosphate is in a mechanical sense a far superior product to the den superphosphate.

These mechanical characteristics explain the striking superiority of autoclave superphosphate by which it may readily and immediately be handled without any substantial disintegration. The tests on the den product indicate to some extent the reason why freshly made den products so readily plasticize inasmuch as it presents minimal resistance to compression. With any degree of handling at all it tends to break down and form a clayey plastic mass.

Another striking characteristic of the autoclave superphosphate is its apparent density. One cubic foot of the autoclave superphosphate contains from 78 to 80 lbs. of the product, while one cubic foot of den superphosphate contains only from 55 to 56 lbs. Comparing the two products from the standpoint of apparent specific volume, it may be stated that if the apparent specific volume of the den superphosphate is taken as 1.00, then that of the autoclave superphosphate will be .75. In other words, the ratio of the specific volume of the autoclave superphosphate to the den superphosphate is 3 to 4. The advantages of this are obvious. The economies effected in saving on storage space are proportionate to the apparent density.

It will be noted from representative analyses previously given that the percentage of available $P_2O_5$ is approximately 10% higher in autoclave superphosphate than in den superphosphate. This is due to two factors; first a lower total water content of autoclave superphosphate, and secondly a relatively higher acidulation on the basis of the acid-rock ratio. This higher percentage of available $P_2O_5$ in the case of autoclave superphosphate means that there is an additional saving in storage space as well as in handling charges and freight.

These factors, considered either separately or in toto, show very clearly that the autoclave superphosphate possesses mechanical properties which very sharply and strikingly distinguish it from the den product. This distinction furthermore obtains in those factors which are of importance, that is to say, those which are very material in controlling the efficacy or suitability of the products for handling and distribution.

Besides these striking physical differences, certain physiochemical distinctions between the two products obtain.

An impressive difference between the autoclave superphosphate and the den product made up under similar conditions of rock-acid radio and acid strength is the water content. As will be observed from the table of analysis of the two products, the autoclave superphosphate has less combined water, less free water and consequently less total water.

The method for determining total water is Penfield's method as given in Washington's book on Analysis of Rocks. Dehydrated lime was used in the determination. The term free water is the loss in weight determined at 100° C. According to the A. O. A. C. official methods the figures given below unequivocally show that the autoclave material is in fact a drier product.

As will be seen from the free water content, these products are considerably drier than the average commercial product. It is interesting to note that although the free water varies considerably, the percentage of combined water, which is the real criterion, shows that the autoclave product has a decidedly lower combined water content than the den superphosphate.

| Sample | Material | Total water | Free water | Combined water |
|---|---|---|---|---|
| I Den super | 80-100 ratio using 52° Bé. acid. | 12.12 | 2.74 | 9.38 |
| II Den super | 93-100 ratio using 52° Bé. acid. | 13.7 | 3.6 | 10.01 |
| III Den super | 93-100 ratio using 52° Bé acid. | 16.40 | 7.00 | 9.4 |
| IV Autoclave super | 82-100 ratio using 54° Bé. acid. | 8.08 | 1.6 | 6.48 |
| V Autoclave super | 81-100 ratio on 52° Bé. basis using 55° Bé. acid. | 10.34 | 3.54 | 6.8 |
| VI Autoclave super | 82-100 ratio using 54° Bé. acid. | 11.13 | 4.12 | 7.01 |

These materials treated were allowed to stand for at least one year between the manufacture and the test. The data given was actually as determined and was not reduced to a common fixed percentage of $P_2O_5$ for each sample. The available $P_2O_5$ for these samples of superphosphate varied substantially from 18.5 to 19. The method used for the free moisture determinations given in the above table was that given by the A. O. A. C.

Inasmuch as it is believed by some investigators that this method, which consists of determination of the loss in weight of the sample heated at 100° C. for five hours, also possibly drives off some of the combined water, we have made free moisture determinations of loss in weight by heating one sample at 50° C. to constant weight and keeping another sample in an evacuated dessicator over sulphuric acid at room temperature to constant weight. The results obtained are given in the following table. The samples used were taken from fairly fresh commercial superphosphates 16% $P_2O_5$.

| Sample | Total water | Free water | | Vac. dess. | Combined water |
|---|---|---|---|---|---|
| | | At 100° C. | At 50° C. | | |
| Autoclave super | 10.25 | 6.38 | 4.82 | 5.4 | 3.87 |
| Den super | 14.44 | 8.84 | 6.14 | 6.82 | 5.6 |
| Den super | 13.7 | 8.0 | 6.05 | 6.1 | 5.7 |

It will thus be seen that the product of the present invention is new in fact. This novelty apparently resides in a marked differential in physical characteristics as compared to prior products and particularly in those characteristics which materially affect the manipulation, distribution and use of the material.

When the product which is made by the process disclosed is dried it has a percentage drop in water soluble content of approximately eight per cent. When den superphosphate is dried, it has a percentage drop in water soluble content of approximately thirty-eight per cent. This clearly indicates a great difference in the product that is made by our process and the den superphosphate of commerce.

The drying of the den superphosphate and of our product was the same and comprised drying in a rotary drum wherein the material passed from one end of the drum to the other in from two to three minutes during which time it was subjected to the concurrent flow of hot gases from a coal furnace which contacted with the material. The gases entered the rotary dryer at approximately 1800° F. and left the rotary dryer at approximately 195 to 205° F. The den superphosphate showed a percentage drop in water soluble material referred to in the preceding paragraph under this treatment whereas the product made by our process showed a percentage drop in water soluble material of considerably less as indicated.

As shown in Fig. 1, the product obtained is of porous ball form having a dense, indurated outer surface and is of internally cellular or vesicular structure, the cells, as depicted, being of varying size and distributed unevenly throughout the mass. The walls of the cells are of a dense hard nature and are relatively thick.

Due to the globulated or nodulated character of the autoclave superphosphate and to the relatively large quantities of small nodules which are formed, the material after being prepared may be directly screened to obtain a large proportion which is in perfect mechanical condition for direct application to the soil. This large percentage of indurated hard fines will be appreciated from an inspection of the relatively small size nodules shown in Fig. 1. Due to its high mechanical strength and its hardness, the entire mass may be rapidly handled immediately after production without any breaking down or plasticizing. This, as has been emphasized hereinbefore, very markedly distinguishes this material from the den superphosphate. As has been explained, the autoclave superphosphate does not cake, and in this factor is just as sharply distinguished and differentiated from the usual den product. The non-caking qualities of the autoclave superphosphate are largely retained even when fertilizer mixtures are made up with fresh materials. In those factors which are important in the production and manipulation of the material, the autoclave phosphate manifestly presents strikingly superior characteristics and qualities.

The improvement in this new product over prior den products is further borne out when the factors which are involved in distribution of the material on the soil are considered. The drillability and the angle of repose of the autoclave superphosphate are so markedly better than the den product as to render this difference one almost of kind.

The autoclave superphosphate is in fact free flowing. The den superphosphate is not. Due to the free flowing characteristics of this autoclave product it can be distributed more uniformly, thereby more efficient fertilization may be secured.

While certain materials have been made, described and tested, it is to be understood that the disclosure of these is given merely to exemplify the improved type of material. The invention is considered to reside in the provision of a new phosphate fertilizer as defined in the appended claims.

We claim:

1. As a new product, a phosphate fertilizer in porous discrete nodular encrusted and indurated globoid particles, having a crushing strength in excess of several times as great as fully cured den superphosphate.

2. As a new product, a phosphate fertilizer in porous discrete nodular encrusted and indurated globoid particles, having a crushing strength of the order of 170 pounds per square inch or greater when freshly made.

3. As a new product, a phosphate fertilizer in porous discrete nodular encrusted and indurated globoid particles, which has a crushing strength of the order of 300 pounds per square inch or greater.

4. As a new product, a phosphate fertilizer in porous discrete nodular encrusted and indurated globoid particles, having a crushing strength in excess of several times as great as fully cured den superphosphate, and having a tensile strength in excess of ten pounds per square inch.

5. As a new product, a phosphate fertilizer in porous discrete nodular encrusted and indurated globoid particles, having a crushing strength of the order of 170 pounds per square inch or greater when freshly made, which has a tensile strength in excess of twenty pounds per square inch.

6. As a new product, a phosphate fertilizer in porous discrete nodular encrusted and indurated globoid particles, which has a crushing strength of the order of 300 pounds per square inch or greater, and a tensile strength of the order of 40 pounds per square inch.

7. As a new product, a phosphate fertilizer in porous discrete nodular encrusted and indurated globoid particles, having a crushing strength in excess of several times as great as fully cured den superphosphate, and a weight of the order of 78 pounds per cubic foot.

8. As a new product, a phosphate fertilizer in porous discrete nodular encrusted and indurated globoid particles, having a crushing strength of the order of 170 pounds per square inch or greater when freshly made, and a weight of the order of 78 pounds per cubic foot.

9. As a new product, a phosphate fertilizer in porous discrete nodular encrusted and indurated globoid particles, which has a crushing strength of the order of 300 pounds per square inch or greater, and a weight of the order of 78 pounds per cubic foot.

10. An autoclaved processed phosphate fertilizer comprising densified indurated individual particles which are substantially non-adherent, and which are characterized by high compressive strength and hardness and which when dried for from two to three minutes in a rotary dryer subjected to concurrent flow of hot gases which entered the dryer at approximately 1800° F. and left the dryer at approximately 195 to 205° F. show a percentage drop in water soluble material approximately one-fourth as great as that of fully cured den superphosphate subjected to the same drying process.

11. As a new product, a phosphate fertilizer in porous discrete nodular encrusted and indurated globoid particles, having a crushing strength in excess of several times as great as fully cured den superphosphate, and containing potash material.

12. As a new product, a phosphate fertilizer in porous discrete nodular encrusted and indurated globoid particles, having a crushing strength in excess of several times as great as fully cured den superphosphate, and containing nitrogenous material.

13. As a new product, a phosphate fertilizer in porous discrete nodular encrusted and indurated globoid particles, having a crushing strength in excess of several times as great as fully cured den superphosphate and containing potash and nitrogenous material.

BEVERLY OBER.
EDWARD H. WIGHT.